No. 774,423. Patented November 8, 1904.

UNITED STATES PATENT OFFICE.

JOSEPH HEINEMAN, OF NEW YORK, N. Y.

LUSTROUS COMPOSITION.

SPECIFICATION forming part of Letters Patent No. 774,423, dated November 8, 1904.

Application filed May 3, 1904. Serial No. 206,122. (No specimens.)

*To all whom it may concern:*

Be it known that I, JOSEPH HEINEMAN, a citizen of the United States, and a resident of New York, in the county of New York and State of New York, have invented certain new and useful Improvements in Lustrous Composition, of which the following is a specification.

It frequently happens that persons take poisons from medicine-bottles by mistake because the contents are not sufficiently well indicated to give warning, and especially is this so when bottles are kept in dark places or hurriedly taken up in the dark. To avoid such mistakes is the object of my invention.

My composition consists of the following ingredients, combined in the proportions stated, viz: aluminium, (finely powdered, soft, and chemically pure,) one and one-half pounds; varnish, (made from diluted rubber and gum, purified,) one gallon; sulfur, five per cent.

The ingredients of the varnish referred to are one-fourth ounce of pure rubber, one-half pound of elemi, three pounds of colophony, and one gallon of solvent (coal-tar) naphtha. The rubber is dissolved in one and one-half pints of naphtha. The elemi is dissolved in one quart of naphtha, and to this soluion is added the colophony and the balance of naphtha. After the colophony is dissolved the solution is filtered and the solution of rubber is added to the filtrate. To the varnish thus resulting is added one and one-half pounds of aluminium, chemically pure and finely powdered, and ten ounces of washed sulfur, (which is equivalent to five per cent.) The said ingredients under the conditions stated are to be thoroughly mixed to a proper consistency and when so combined form a luminous composition which may be applied by a brush or in any suitable manner to bottles and other like articles and also to other surfaces where a luminous effect is desired.

When my composition is applied to physicians' and druggists' prescription-bottles containing poisonous substances only, the person taking up the bottle in the dark is warned that it contains poison.

While my composition is designed for use on physicians' and druggists' prescription-bottles containing poisonous substances only and like receptacles, it may be used on any surface where a luminous effect is desired.

I am aware that luminous paints have been made, but not of the same ingredients or in the same proportion as my composition.

I do not desire to be limited to the exact proportions stated, but reserve the right to such modifications as may be fairly considered in the scope of my invention.

From the foregoing description it will be readily appreciated that the features embodying my invention are not only extremely simple, but result in a great saving of life in the service for which it is intended.

Having thus described my invention, what I claim as new, and desire to secure by Letters Patent, is—

The herein-described lustrous composition, consisting of aluminium (finely powdered and chemically pure,) transparent varnish and sulfur.

Signed at New York, in the county of New York and State of New York, this 30th day of April, A. D. 1904.

JOSEPH HEINEMAN.

Witnesses:
CHAS. S. CLAGETT,
CHAS. L. WOLF